US009008365B2

(12) United States Patent
Xu et al.

(10) Patent No.: US 9,008,365 B2
(45) Date of Patent: Apr. 14, 2015

(54) SYSTEMS AND METHODS FOR PEDESTRIAN DETECTION IN IMAGES

(71) Applicant: Huawei Technologies, Co., Ltd., Shenzhen (CN)

(72) Inventors: Jingsong Xu, Kingsford (AU); Zefeng Ni, South Hurstville (AU); Qiang Wu, Ashfield (AU); Jian Zhang, Kensington (AU); Haibo Liu, Shenzhen (CN); Chen-Xiong Zhang, Plano, TX (US); Wei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 13/865,620

(22) Filed: Apr. 18, 2013

(65) Prior Publication Data

US 2014/0314271 A1 Oct. 23, 2014

(51) Int. Cl.
 *G06K 9/00* (2006.01)
 *G06E 1/00* (2006.01)

(52) U.S. Cl.
 CPC .................................. *G06K 9/00369* (2013.01)

(58) Field of Classification Search
 USPC ......... 382/100, 103, 106–107, 159, 162, 168, 382/173, 181, 190, 199, 209, 219, 224–225, 382/232, 254, 266, 274, 276, 286–291, 305, 382/312; 706/25, 20
 See application file for complete search history.

(56) References Cited

U.S. PATENT DOCUMENTS

| | | | | |
|---|---|---|---|---|
| 5,819,247 | A * | 10/1998 | Freund et al. | 706/25 |
| 7,099,510 | B2 * | 8/2006 | Jones et al. | 382/225 |
| 8,131,011 | B2 | 3/2012 | Nevatia et al. | |
| 2007/0237387 | A1 * | 10/2007 | Avidan et al. | 382/159 |
| 2010/0272366 | A1 * | 10/2010 | Meng et al. | 382/190 |
| 2011/0249867 | A1 | 10/2011 | Haas et al. | |
| 2011/0255743 | A1 * | 10/2011 | Guan et al. | 382/103 |

OTHER PUBLICATIONS

Broida, T. et al., "Estimation of Object Motion Parameters from Noisy Images," IEEE Transactions on Pattern Analysis and Machine Intelligence, Jan. 1986, pp. 90-99, vol. PAMI-8, No. 1.
Papageorgiou, C. et al., "A Trainable System for Object Detection," International Journal of Computer Vision 38(1), Jun. 2000, 19 pages, vol. 38, Issue 1, Kluwer Academic Publishers, Massachusetts Institute of Technology.
Viola, P. et al., "Rapid Object Detection using a Boosted Cascade of Simple Features," Proceedings of the 2001 IEEE Computer Science Conference on Computer Vision and Pattern Recognition, 2001, pp. I-511-I-518, vol. 1.
Müller, K.R. et al., "An Introduction to Kernel-Based Learning Algorithms," IEEE Transactions on Neural Networks, Mar. 2001, 22 pages, vol. 12, No. 2.

(Continued)

*Primary Examiner* — Seyed Azarian
(74) *Attorney, Agent, or Firm* — Slater & Matsil, L.L.P.

(57) ABSTRACT

System, apparatus, and method embodiments are provided for detecting the presence of a pedestrian in an image. In an embodiment, a method for determining whether a person is present in an image includes receiving a plurality of images, wherein each image comprises a plurality of pixels and determining a modified center symmetric local binary pattern (MS-LBP) for the plurality of pixels for each image, wherein the MS-LBP is calculated on a gradient magnitude map without using an interpolation process, and wherein a value for each pixel is a gradient magnitude.

31 Claims, 7 Drawing Sheets

FEATURE VECTOR FOR THE PATCH (32x96) IS THE CONCATANATION OF THE HISTORGRAMS OF ALL THE OVERLAPPING BLOCKS

CELL SIZE: 4 x 4; BLOCK SIZE: 8 x 8, i.e. 2 x 2 CELLS;
TOTAL NUMBER OF BLOCKS: 7 x 23; FEATURE VECTOR DIMENSION: 7 x 23 x 16 = 2576

(56) References Cited

OTHER PUBLICATIONS

Ojala, T. et al., "Multiresolution Gray-Scale and Rotation Invariant Texture Classification with Local Binary Patterns," IEEE Transactions on Pattern Analysis and Machine Intelligence, Jul. 2002, 17 pages, vol. 24, No. 7.

Sato, K. et al., "Temporal spatio-velocity transform and its application to tracking and interaction," Computer Vision and Image Understanding, Feb. 2, 2004, 29 pages, vol. 96, Elsevier, Inc.

Dalal, N. et al., "Histograms of Oriented Gradients for Human Detection," Proceedings of the 2005 IEEE Computer Society Conference on Computer Vision and Pattern Recognition, Jun. 25, 2005, 8 pages, vol. 1.

Tuzel, O. et al., "Human Detection via Classification on Riemannian Manifolds," IEEE Conference on Computer Vision and Pattern Recognition, 9 pages, Jun. 17-22, 2007.

Wojek, C. et al., "A Performance Evaluation of Single and Multi-feature People Detection," Proceedings of the 30th DAGM Symposium on Pattern Recognition, 2008, pp. 82-91, Springer-Verlag, Berlin, Heidelberg.

Felzenszwalb, P. et al., "A Discriminatively Trained, Multiscale, Deformable Part Model," IEEE Conference on Computer Vision and Pattern Recognition, Jun. 23-28, 2008, pp. 1-8.

Maji, S. et al., "Classification using Intersection Kernel Support Vector Machines is Efficient," IEEE Conference on Computer Vision and Pattern Recognition, Jun. 23-28, 2008, 8 pages.

Wang, X., et al. "An HOG-LBP Human Detector with Partial Occlusion Handling," 2009 IEEE $12^{th}$ International Conference on Computer Vision (ICCV), 2009, pp. 32-39.

Dollár, P. et al., "Integral Channel Features," Proceedings of the British Machine Vision Conference, Sep. 2009, 11 pages, BMVA Press.

Vedaldi, A. et al., "Multiple Kernels for Object Detection," 2009 IEEE $12^{th}$ International Conference on Computer Vision (ICCV), Sep. 29, 2009-Oct. 2, 2009, pp. 606-613.

Kalal, Z. et al., "Tracking-Learning-Detection," IEEE Transactions on Pattern Analysis and Machine Intelligence, Jan. 2010, pp. 1-14, vol. 6, No. 1.

Zheng, Y. et al., "Pyramid Center-Symmetric Local Binary/Trinary Patterns for Effective Pedestrian Detection," Lecture Notes in Computer Science, 2011, 11 pages, vol. 6495, Springer-Verlag, Berlin, Heidelberg.

Wu, J. et al., "Real-Time Human Detection Using Contour Cues," 2011 IEEE International Conference on Robotics and Automation (ICRA), Shanghai International Conference Center, May 9-13, 2011, pp. 860-867, Shanghai, China.

Dollár, P. et al., "Pedestrian Detection: An Evaluation of the State of the Art," IEEE Transactions on Pattern Analysis and Machine Intelligence, Apr. 2012, 20 pages, vol. 34, Issue 4.

\* cited by examiner

SYSTEMS AND METHODS FOR PEDESTRIAN DETECTION IN IMAGES

TECHNICAL FIELD

The present invention relates to image processing, and, in particular embodiments, to systems and methods for detecting the presence of a person in an image captured by a camera.

BACKGROUND

Surveillance cameras are cameras used to observe an area. Surveillance cameras may be video cameras or still cameras programmed to capture a new image periodically (e.g., one image per second). Surveillance cameras are used by businesses, residences, and governments to detect threats to individuals or property. Many surveillance systems offer automated threat detection that reduces the need to employ users to continually monitor the images generated by the surveillance cameras. Automatic detection of people in the images captured by the surveillance cameras is an important feature of theses surveillance systems since people are often the source of the threat sought to be deterred. By determining whether an image contains an individual, the surveillance system may reduce the amount of time and the number of images that are actually presented to a user, such as a security guard. Many systems for determining whether an image contains a person are available, but many of these systems suffer from poor performance.

SUMMARY OF THE INVENTION

In accordance with an embodiment, a method for determining whether a person is present in an image includes receiving a plurality of images, wherein each image comprises a plurality of pixels and determining a modified center symmetric local binary pattern (MS-LBP) for the plurality of pixels for each image, wherein the MS-LBP is calculated on a gradient magnitude map without using an interpolation process, and wherein a value for each pixel is a gradient magnitude. In an embodiment, the method includes additional feature combination methods that further improve the detection performance of the system. Instead of cascading multiple homogeneous classifiers (a common framework of existing technologies), the disclosed systems either integrate two different features on a single-stage classifier (feature concatenation) or apply two different features on linked classifiers (two-layer) in a non-homogeneous manner. In addition, in an embodiment, a multi-frame accumulation technique is utilized through a tracking-like approach on image sequence. The disclosed detection system is scalable and integratable into other existing surveillance systems.

In accordance with another embodiment, a network component configured for determining a presence of a pedestrian in an image includes a processor and a computer readable storage medium storing programming for execution by the processor, the programming including instructions to: receive a plurality of images, wherein each image comprises a plurality of pixels and determine a modified center symmetric local binary pattern (MS-LBP) feature for the plurality of pixels for each image, wherein the MS-LBP feature is calculated on a gradient magnitude map without using an interpolation process, and wherein a value for each pixel is a gradient magnitude.

In accordance with another embodiment, a system for determining whether an image contains an image of a pedestrian includes a feature computation unit comprising a processor, wherein the feature computation unit is configured to determine a modified center symmetric local binary pattern (MS-LBP) feature for a plurality of pixels for an image, wherein the MS-LBP feature is calculated on a gradient magnitude map without using an interpolation process, and wherein a value for each pixel is a gradient magnitude and a classifier/detector configured to determine whether the image contains an image of a person based at least in part on the MS-LBP.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods to detect people (e.g., pedestrians) in images captured by cameras. The terms people, person, pedestrian, and human are used interchangeably throughout this disclosure. In an embodiment, a modified local binary pattern based image feature describing pedestrian objects is disclosed. The magnitudes and the gradients of pixels in the image are calculated and applied to calculate binary patterns. Support vector machine (SVM) classifiers are combined with other methods to determine whether a picture captured by a camera includes an image of a person. In an embodiment, the picture is a frame from a video. Each calculated binary pattern is associated with a weight which is trained by the support vector machine. The image is divided into different overlapping blocks of fixed size. An integral image is stored for each block. A final integral image is built based on the integral image of each block with the weights from the pre-trained support vector machine. This integral image contains features and classifiers and can directly determine whether the test image contains a person. Experiments on public National Institute for Research in Computer Science and Control (INRIA) datasets and videos collected in real scenes show that speed, accuracy, and computation complexity of the disclosed method outperform benchmark methods.

In an embodiment, the disclosed systems and methods include additional feature combination methods that further improve the detection performance of the system. Instead of cascading multiple homogeneous classifiers (a common framework of existing technologies), the disclosed systems either integrate two different features on a single-stage classifier (feature concatenation) or apply two different features on linked classifiers (two-layer) in a non-homogeneous manner. In addition, a multi-frame accumulation technique is utilized through a tracking-like approach on image sequence. The disclosed detection system is scalable and integratable into other existing surveillance systems.

In an embodiment, the system receives an input image and calculates the gradient magnitude of each pixel using a Sobel operation to build a gradient magnitude map. A Sobel operation is a discrete differentiation operation that computes an approximation of the gradient of the image intensity function. A Sobel operation is well known to those of ordinary skill in the art of image processing. The gradient magnitude is the square root of the horizontal and vertical gradient magnitudes. The system then calculates the modified center-symmetric local binary pattern (MS-LBP) for each pixel on the gradient map. MS-LBP ignores the interpolation process in the original center-symmetric local binary pattern and is built based on the gradient image while not gray image. More information about CS-LBP may be found in Y. Zheng, C. Shen, R. Hartley, and X. Huang, Pyramid center-symmetric local binary/trinary patterns for effective pedestrian detection, $10^{th}$ Asian Conference Computer Vision, pp. 281-292, 2010, which is incorporated herein by reference as if reproduced in its entirety. This low-complexity and discriminative appearance based feature (i.e., MS-LBP) is efficient and effective in detecting pedestrians in the disclosed systems.

In an embodiment, for feature extraction, the training image is divided into different blocks and the MS-LBP histograms are computed as a feature.

In an embodiment, the process of testing (i.e., implementing the pedestrian detection system) is similar to that of training. After obtaining the MS-LBP block feature, it is placed into the pre-trained linear SVM classifier. The SVM classifier gives the classification result to determine whether the test image is a pedestrian. In an embodiment, the sliding window technique is utilized to detect pedestrians of different sizes. To further speed up the process, the pedestrian object feature and the corresponding classifier (i.e., linear SVM) information is embedded based on the proper block spanning over the whole image. In this way, the expensive multiplication operation in the legend linear SVM is avoided. Specifically, the image is divided into different overlapping blocks of fixed size. An integral image is stored for each block. A final integral image is built based on the integral image of each block with the weights from the pre-trained support vector machine. This integral image contains features and classifiers and can directly determine whether the test image contains a person.

The disclosed systems support Local Binary Pattern (LBP). More information about LBP can be found in T. Ojala, M. Pietikainen, and T. Maenpaa, Multi-resolution gray-scale and rotation invariant texture classification with local binary patterns, Institute of Electrical and Electronics Engineers (IEEE) Transaction on Pattern Analysis and Machine Intelligence, 24(7): 971-987, 2002, which is incorporated herein by reference as if reproduced in its entirety. In an embodiment, the LBP value is calculated on the gradient magnitude image and the interpolation process is ignored. Such a feature is also called CENTRIST. More information about CENTRIST can be found in J. Wu, C. Geyer, and J. M. Rehe, Real-time human detection using contour cues, IEEE International Conference on Robotics and Automation, pp. 860-867, May 2011, which is incorporated herein by reference as if reproduced in its entirety.

In an embodiment, a method for combining MS-LBP and LBP to further improve the detection performance is provided. In one embodiment, the two feature vectors (MS-LBP and LBP) are concatenated into one feature vector and fed into a single-stage SVM classifier. In another embodiment, a two-layer classifier is provided. In this embodiment, the MS-LBP classifier is performed first followed sequentially by the LBP classifier. In this manner, the LBP feature does not have to be calculated on all image patches since the first layer (i.e., the MS-LBP classifier) will reject most of the patches. The MS-LBP is a faster computation than the LBP.

Experiments on the public human detection dataset, INRIA, show that the disclosed single feature detector MS-LBP+SVM outperforms the benchmark method histogram of oriented gradients (HOG)+SVM. Under PASCAL criterion, the detection rate for the disclosed single feature detector MS-LBP+SVM is 66% while the HOG+SVM detection rate is only 59% when the false positive per image is 10%. Thus, the disclosed single feature detector MS-LBP+SVM outperforms the conventional HOG+SVM by 7%. Furthermore, the detection speed of the disclosed single feature detector MS-LBP+SVM is nearly 20 times faster than the HOG+SVM detection method, achieving about 20 frames per second for 320×240 pixel images (the CPU is Intel Core i5-2400 3.1 GHz). Also, the disclosed two-layer classifier achieves similar results with a 71% detection rate, which is 12% better than the conventional HOG+SVM method.

In an embodiment, a tracking-like method is applied for accumulating detection results on the consecutive image sequence in order to refine the coarse results, which further boosts the overall detection performance. More information about tracking-like methods can be found in T. J. Broida and R. Chellappa, Estimation of object motion parameters from noisy images, IEEE Transaction on Pattern Analysis and Machine Intelligence, (1):90-99, 1986, which is incorporated herein by reference as if reproduced in its entirety. One additional benefit of the refining process with the tracking-like method is that it can recover detection trace if it is accidentally missed in some frames.

Figure 1:
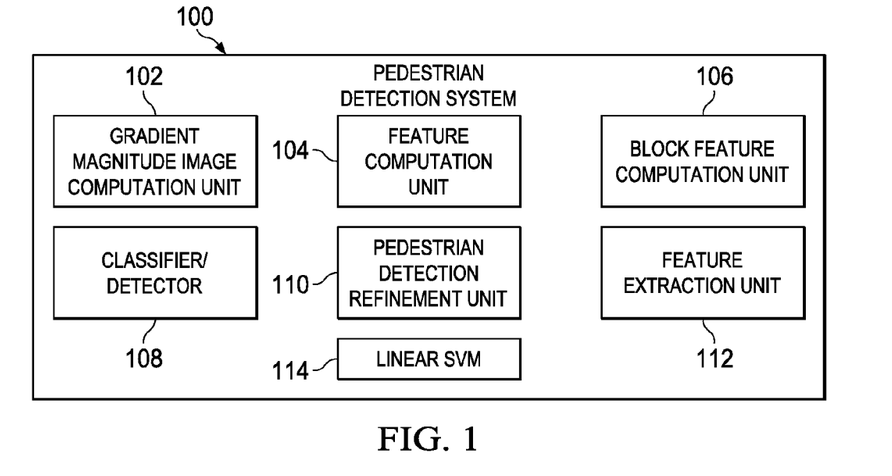
FIG. 1 illustrates an embodiment system for detecting the presence of people in an image.

FIG. 1 illustrates an embodiment system 100 for detecting the presence of people in an image. The system 100 includes a gradient magnitude image computation unit 102, a feature computation unit 104, a block feature computation unit 106, a classifier/detector 108, a pedestrian detection refinement unit 110, a feature extraction unit 112, and a linear SVM 114. The system 100 may include additional functional units as well. The components 102, 104, 106, 108, 110, 112, 114 may be implemented as software, firmware, hardware, or a combination thereof. The components 102, 104, 106, 108, 110, 112, 114 may include a processor or may be implemented by a processor. The functions of two or more of the components 102, 104, 106, 108, 110, 112, 114 may be combined into a single component.

The gradient magnitude image computation unit 102 receives images and calculates the gradient of each image. During a training phase, the output of the gradient magnitude image computation unit 102 is provided to the feature computation unit 104 which computes either a single feature MS-LBP or integrated features MS-LBP and LBP. During a training phase, the results from the feature computation unit 104 are provided to the feature extraction unit 112 which, in a single feature option, extracts MS-LBP features from blocks, and in the integrated features option, extracts the MS-LBP and the LBP feature from blocks. The results from the feature extraction unit 112 are provided to the linear SVM 114 to train the classifier/detector 108.

During the deployment phase (i.e., when the system 100 is being used to detect pedestrians), the images are again fed to the gradient magnitude image computation unit 102 with the output of the gradient magnitude image computation unit 102 provided to the feature computation unit 104. The feature computation unit 104 computes either the single feature MS-LBP or the integrated features MS-LBP and LBP depending on the option chosen. The feature computation unit 104 operates on pixels. The output from the feature computation unit 104 is provided to block feature computation unit 106 which computes for the blocks (which are groups of pixels) either the single feature MS-LBP or the integrated feature MS-LBP depending on the option selected. The results from the block feature computation unit 106 are provided to the classifier/detector 108 to determine whether the image contains a person. The results from the classifier/detector 108 is provided to the pedestrian detection refine unit 110 which refines the pedestrian detection through multi-frame accumulation. More details about each of these components, the MS-LBP, the LBP, and pedestrian detection refinement are provided below.

As used herein, a feature describes the characteristics of the input images, which will be measured by algorithms for recognizing/detecting objects inside the images. In mathematics, different features are created by different feature descriptors and presented as vectors. In an embodiment, the feature is called MS-LBP. More details about MS-LBP are provided below.

The classifier/detector is a typical mathematics model for decision making. In an embodiment, the classifier is used to recognize pedestrians in the input images given pedestrian features are presented. Before implementing the classifier, it needs to be trained based on the given training samples. During the training procedure, various parameters in the classifier model are calculated. Different features used for describing objects in training process will produce the different settings of classifier. Once training process is completed, classifier can be used to recognize the object of interest. More details about classifiers are provided below.

A cascade structure of classifier normally has more than one sub-classifier sequentially linked to each other. All these sub-classifiers follow the same mathematics model and trained based on the same style of object feature. Sometimes, it is also called homogeneous classifier structure.

In an embodiment, a multi-layer structure of classifier is used in classifier/detector 108. A multi-layer structure is an extension of the cascade structure. It shares the same configuration as cascade structure: more than on sub-classifier linked to each other. However, the sub-classifiers in a multi-layer structure are not necessarily homogeneous. That is, each sub-classifier adopts a different mathematics model and is trained independently using a different style of object feature. More information about multi-layer structured classifiers are provided below.

In an embodiment, the feature computation unit 104 and the block feature computation unit 106, the feature is a modified center-symmetric local binary pattern (MS-LBP). More information about LBP may be found in T. Ojala, M. Pietikainen and T. Maenpaa, Multiresolution Gray-Scale and Rotation Invariant Texture Classification with Local Binary Patterns, IEEE Trans. Pattern Anal. Mach. Intell., vol. 24, no. 7, pp. 971-987, July 2002, which is incorporated herein by reference as if reproduced in its entirety. More information about center-symmetric local binary pattern (CS-LBP) may be found in Y. Zheng, C. Shen, R. Hartley, and X, Huang, Pyramid center-symmetric local binary/trinary patterns for effective pedestrian detection, In Proc. 10th Asian Conf. Comput. Vis., pages 281-292, 2010, which is incorporated herein by reference as if reproduced in its entirety. There are at least two differences between MS-LBP as compared with LBP and CS-LBP. First, the MS-LBP value is calculated on gradient magnitude map in which the value of each pixel is the gradient magnitude instead of grey value used by LBP or CS-LBP. The gradient magnitude is less sensitive to noise than grey value according to our study. Second, the MS-LBP does not use interpolation process as CS-LBP does. Instead MS-LBP uses a rectangular neighbourhood. Thus, its calculation process is faster than CS-LBP.

In embodiments, the SVM is used as the classifier model to build the single layer classifier/detector 108. For training the classifier/detector 108, two options for the object feature are available: 1) MS-LBP or 2) combination of MS-LBP and LBP by concatenating the feature vectors of these two. More information about SVM may be found in N. Dalal and B. Triggs, Histograms of oriented gradients for human detection, In Proc. IEEE Conf. Comput. Vis. Pattern Recogn., volume 1, pages 886-893, June 2005 and J. Shawe-Taylor and N. Cristianini, Support Vector Machines and Other Kernel-Based Learning Methods, 2000: Cambridge Univ. Press, both of which are incorporated herein by reference as if reproduced in their entireties.

In some embodiments, the classifier/detector 108 is a two layer classifier. The first layer is a SVM classifier which is trained based on MS-LBP pedestrian feature. The second layer is another independently trained SVM classifier which is trained used LBP feature. That is, it is a non-homogeneous classifier structure. In such a structure, if the input images do not have a pedestrian inside according to the first layer of classifier, the images will be rejected straightway without being further processed by the second layer. If the input images do have pedestrian inside according to the first layer of classifier, they will be further confirmed by the second layer in order to avoid the false alarm caused by the first layer. More about the 2 layer classifier is provided with reference to FIG. 8 below.

Figure 2A:
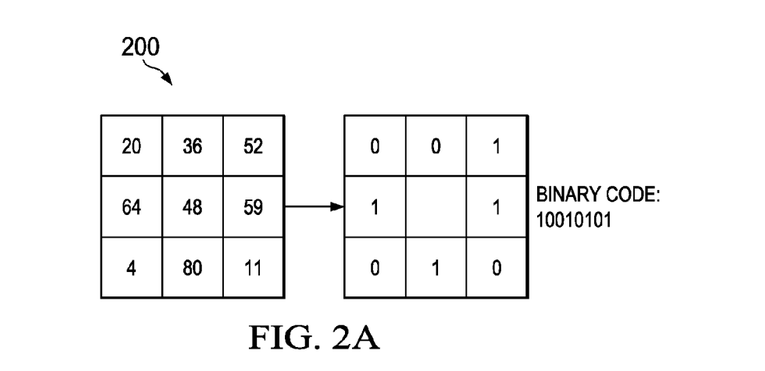
FIGS. 2A-2B illustrate an example of LBP.
Figure 2B:
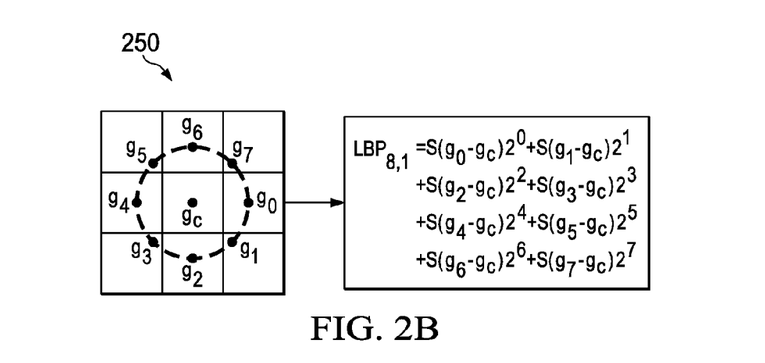

LBP is a texture based feature and has been successfully applied to human detection. More information about LBP may be found in T. Ojala, M. Pietikainen and T. Maenpaa, Multiresolution Gray-Scale and Rotation Invariant Texture Classification with Local Binary Patterns, IEEE Trans. Pattern Anal. Mach. Intell., vol. 24, no. 7, pp. 971-987, July 2002, which is incorporated herein by reference as if reproduced in its entirety. The original LBP value of a pixel is defined by comparing the gray value with its surrounded neighbor pixels. FIG. 2A illustrates an graph 200 illustrating an embodiment of how to calculate the basic LBP value for P=8, R=1. The value of LBP code of a pixel is given by:

$$LBP_{(P,R)} = \sum_{p=0}^{P-1} s(g_p - g_c) 2^p,$$

$$s(x) = \begin{cases} 1, & x \geq 0 \\ 0, & x < 0 \end{cases}$$

where R is the radius; P indicates the number of sampling points; $g_p$ is the gray value of pixel p around the center pixel c and $g_c$ is the gray value of c. p is not restricted to rectangular grid. It can be circularly around the center pixel with bilinear interpolation when p does not fall in the center of a pixel as depicted in graph 250 in FIG. 2B.

Figure 3A:
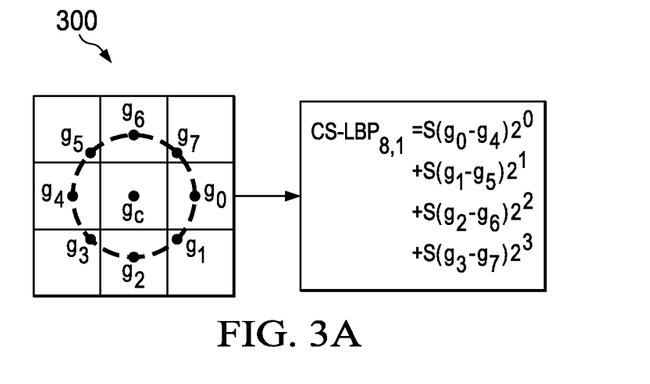
FIGS. 3A-3B illustrate an example of CS-LBP and MS-LBP.
Figure 3B:
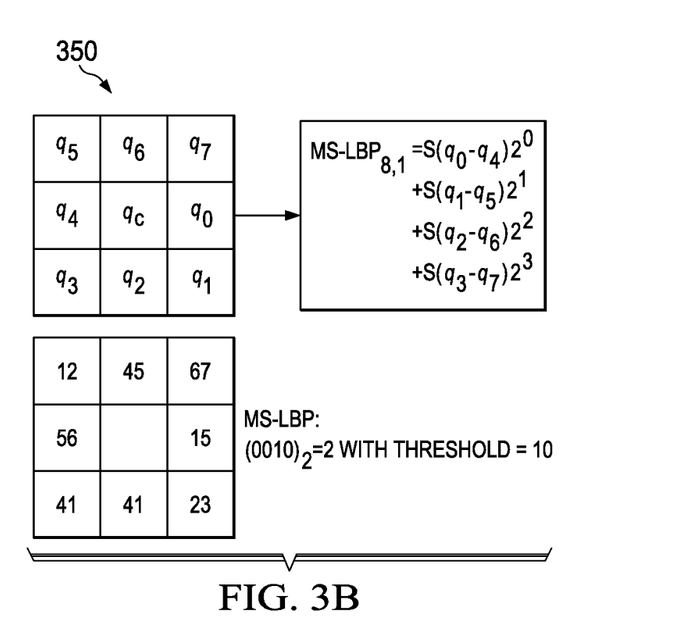

FIGS. 3A-3B illustrate an embodiment Center-Symmetric Local Binary Pattern (CS-LBP) feature 300. More information about CS-LBP may be found in Y. Zheng, C. Shen, R. Hartley, and X, Huang. Pyramid center-symmetric local binary/trinary patterns for effective pedestrian detection, in Proc. 10th Asian Conf. Comput. Vis., pages 281-292, 2010, which is incorporated herein by reference as if reproduced in its entirety. The Center-Symmetric Local Binary Pattern (CS-LBP) feature 300, is a modified version of LBP texture feature descriptor. It is computationally cheap and easy to implement and has the properties of both texture features and gradient-based features. The standard version of a CS-LBP value is formed by comparing center-symmetric pairs of pixels, as illustrated by FIG. 3A. Typically, it is computed by:

$$CS-LBP_t = \sum_{p=0}^{P/2} s(g_p - g_{p+\frac{P}{2}})2^p,$$

$$s(x) = \begin{cases} 1, & x \geq t \\ 0, & x < t \end{cases}$$

Here $g_P$ and $$g_{p+\frac{P}{2}}$$

are the pixel values (e.g., gray level) of center-symmetric pairs of pixels (P in total) spaced around center pixel c. t is a threshold.

In an embodiment, in system 100, a Modified Center-Symmetric Local Binary Patterns (MS-LBP) 350 shown in FIG. 3B, which uses the same function of CS-LBP, is utilized. But MS-LBP value is calculated on gradient magnitude map in which the value of each pixel is the gradient magnitude while not gray value. Gradient magnitude is less sensitive to image noise. Meantime, gradient information (contour information) is better for pedestrian detection. Specifically, Sobel operation is adopted. The gradient magnitude is calculated from the horizontal and vertical gradient magnitude. MS-LBP is faster than CS-LBP because MS-LBP applies rectangular neighbours directly and ignores the interpolation process, shown in FIG. 3B. Typically, it is computed by:

$$MS-LBP_t = \sum_{p=0}^{P/2} s(q_p - q_{p+\frac{P}{2}})2^p,$$

$$q_c = \sqrt{G_x^2 + G_y^2},$$

$$s(x) = \begin{cases} 1, & x \geq t \\ 0, & x < t \end{cases}$$

$$G_x = 2(g_0 - g_4) + (g_7 - g_5) + (g_1 - g_3)$$

$$G_y = 2(g_2 - g_6) + (g_3 - g_5) + (g_1 - g_7)$$

Figure 4:
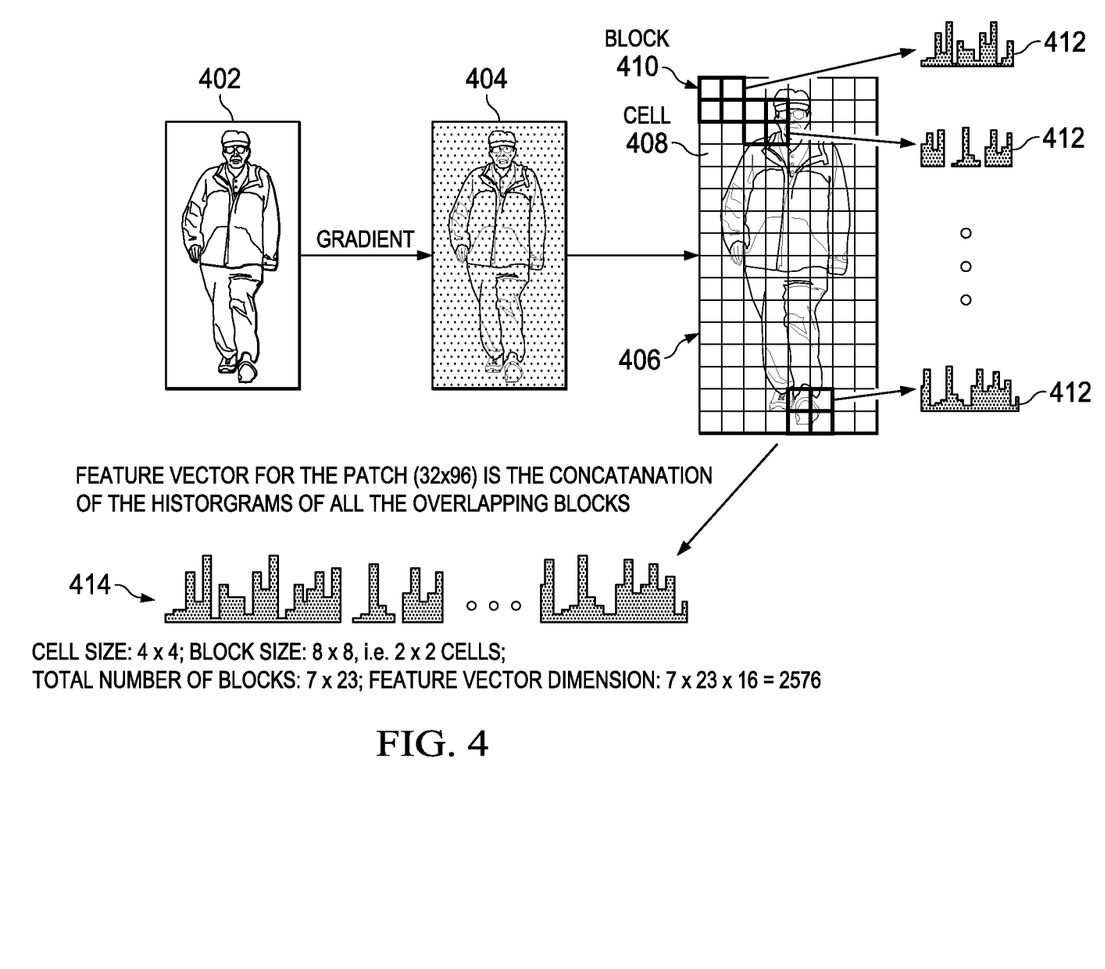
FIG. 4 illustrates an embodiment system for feature vector extraction based on the histogram of MS-LBP.

Here $q_p$ and $$q_{p+\frac{P}{2}}$$

are the gradient magnitude values of center-symmetric pairs of pixels (P in total) spaced around center pixel c, $g_p$ is the gray value around the center pixel without interpolation operation, $G_x$ and $G_y$ are the horizontal and vertical gradient magnitude which are calculated from the eight neighbours without interpolation, the gradient magnitude of each pixel $q_c$ is calculated from $G_x$ and $G_y$, thus $q_p$ and $$q_{p+\frac{P}{2}}$$

can be calculated in the same way. t is a small value used to threshold the difference to increase robustness of the value. The MS-LBP has 16 possible values. Given an image patch, we divided it into a series of cells which size is 4×4 pixels. A block defined to consist of 2×2 cells. For each block, 16-bin histogram is calculated based on the MS-LBP values. A feature vector of the image patch is then calculated as the concatenation of all the histograms of overlapping blocks in the patch. FIG. 4 illustrates how this feature vector is extracted from a 32×96 image patch (training sample). There are 7×23=161 blocks when the block overlapping is one cell, consisting of 7×23×16=2576 dimensional feature vector.

FIG. 4 illustrates an embodiment feature vector extraction system 400 based on the histogram of MS-LBP. The vector extraction system 400 may be implemented by the pedestrian detection system 100 depicted in FIG. 1. In the system 400, an image 402 is received and the gradient 404 of the image 402 is calculated. In the system 400, the LBP feature is also applied resulting in the image 406. Image 406 is divided into cells 408 and blocks 410. Each cell 408 is 4 by 4 pixels in size and each block is 2 by 2 cells in size. A histogram 412 is computed for each block 410. The histograms 412 are concatenated together to form a feature vector 414. Note that the LBP value is calculated on the gradient magnitude image 404 and the interpolation process is ignored, as well. This feature is also called CENTRIST. More information about LBP and CENTRIST may be found in J. Wu, C. Geyer, J. Rehe, Real-time Human Detection Using Contour Cues, IEEE Int. Conf. Robot. Autom. 2011:860-867, which is incorporated herein by reference as if reproduced in its entirety. For simplicity, this feature is referred to herein as LBP. For LBP feature, the block size of the image 406 is 16×24. The overlapping is also the half of the block width and height. This results in 3×7=21 blocks with 3×7×256=5376 dimensional feature vector 412.

Figure 5:
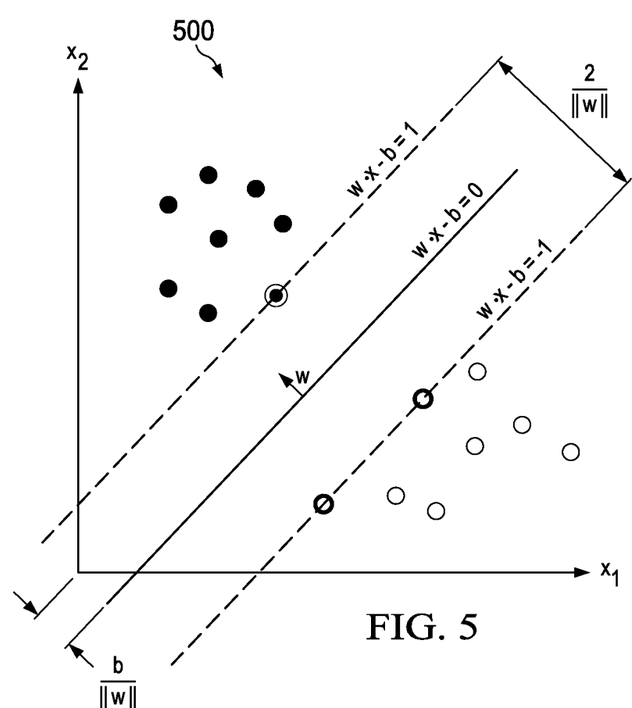
FIG. 5 illustrates an embodiment system for SVM finding maximum-separation hyper-planes to differentiate the two classes in the feature space.

FIG. 5 illustrates a graph 500 of hyperplanes in the feature space. SVM finds maximum-separation hyper-planes (represented by the w) to differentiate the two classes in the feature space. A SVM model is a representation of training examples (feature vectors) as points in the space, mapped so that the examples of the separate categories are divided by a clear gap that is as wide as possible. Given a new example (a new image patch as presented by its feature vector), it is mapped into that same space and predicated to belong to a category based on which side of the gap it falls on. For easy understanding, SVM is represented with vector w and bias b, an image patch (with feature vector v) is classified as positive (i.e. contains a pedestrian) if wx+b>threshold, where the threshold controls the sensitivity of the detection system. Lower threshold gives higher detection rate at the cause of more false alarms.

In an embodiment, multiple consecutive frames in a video stream are explored to improve the detection performance. For example, if a detection window is reported at a frame, however there are no similar detections at nearby frames, it is very likely this detection is a false alarm. Similarly, missed detection can be inserted by exploring multiple frames. This can be useful for a video stream of high frame rate (e.g. 25 frames per second). In an embodiment, to refine the coarse results, a tracking-like algorithm (the ability of associate detection to different persons) is required. Given the specific parameters for Kalman Filter, the location of the object in the next frame can be estimated. This prediction location can be combined with the detection results to evaluate the real position of the object. In this manner, the overall detection performance is further boosted. More information about Kalman Filters may be found in T. J. Broida and R. Chellappa, Estimation of object motion parameters from noisy images, IEEE Trans. Pattern Anal. Mach. Intell., (1):90-99, 1986, which is incorporated herein by reference as if reproduced in its entirety.

Figure 6:
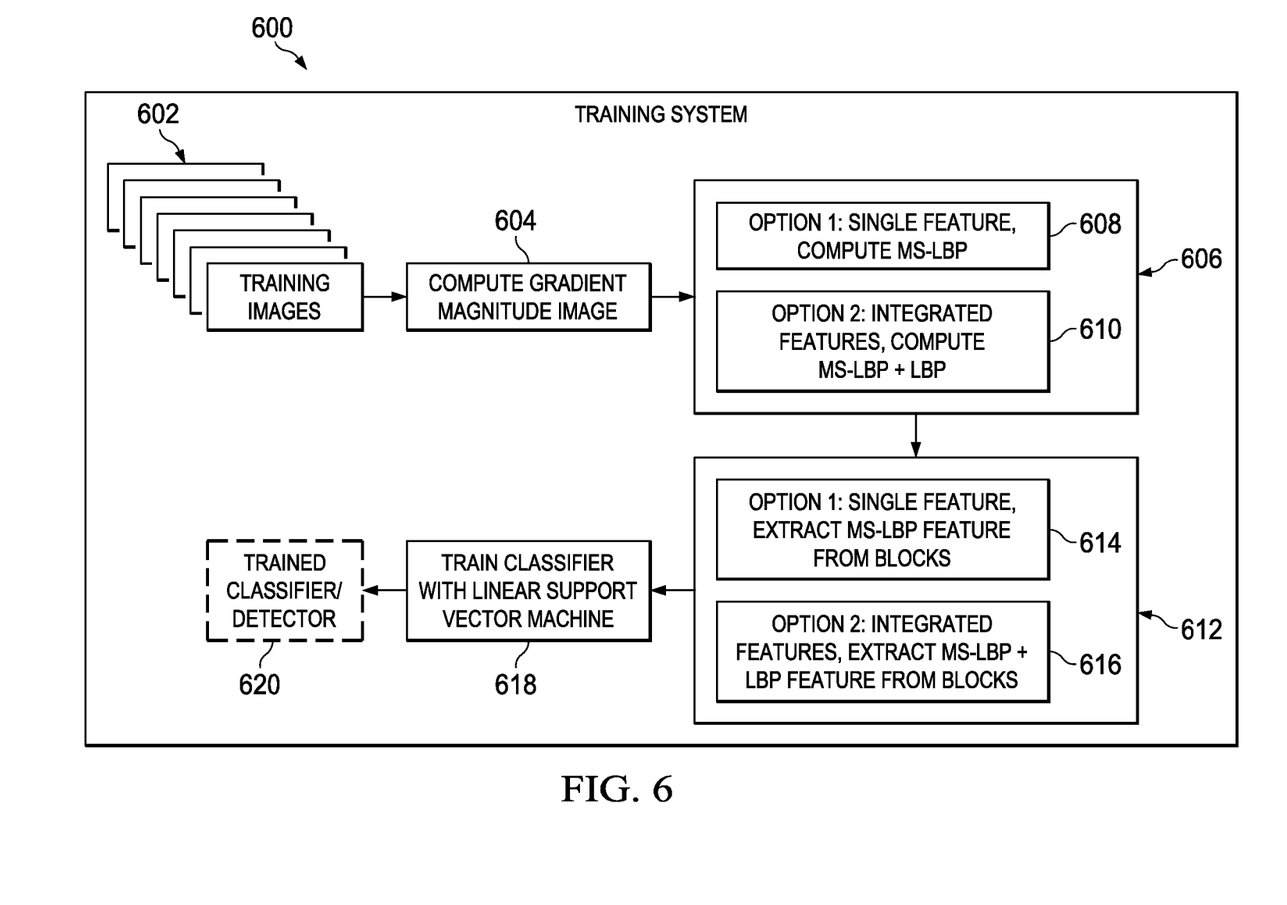
FIG. 6 illustrates an embodiment method for training a pedestrian detection system.

FIG. 6 illustrates an embodiment method 600 for training a pedestrian detection system. For example, the method 600 may be utilized with system 100 to train the classifier/detector 108. The method 600 may begin with the receipt of a plurality of training images 602. In an embodiment, the number of training images 602 may be tens of thousands. The training images 602 are used to train the pedestrian detection system as to what kinds of images contain a pedestrian and what kinds of images do not contain pedestrians. At block 604 the gradient magnitude of an image is computed. At block 606 the feature for the result from block 604 is computed. The feature may be computed using either option 1 608 or option 2 610. Option 1 608 computes a single feature MS-LBP. Option 2 610 computes integrated features MS-LBP and LBP. At block 612, the feature(s) are extracted from the blocks. Block 612 may be executed as either option 1 614 or option 2 616 depending on whether a single feature MS-LBP was computed at block 606 or whether integrated features MS-LBP and LBP were computed at block 606. At block 618, the classifier/detector is trained with a linear SVM to associate some of the patterns computed at block 612 with a pedestrian and some of the patterns computed at block 612 with the condition that a pedestrian is not present. The result of block 618 is a trained classifier/detector 620.

Figure 7:
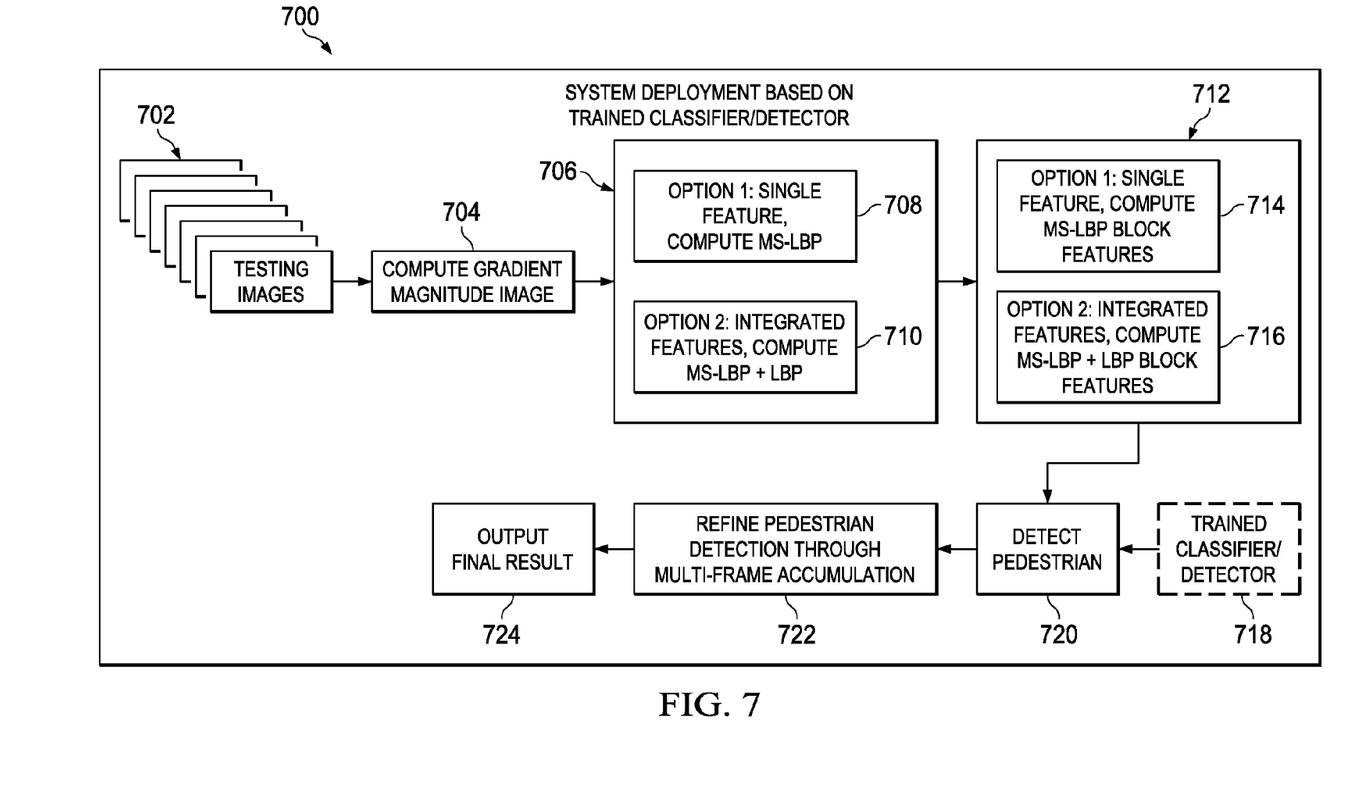
FIG. 7 illustrates an embodiment method for detecting a pedestrian in an image.

FIG. 7 illustrates an embodiment method 700 for detecting a pedestrian in an image. The method 700 begins with the receipt of testing images 702. The testing images 702 may be images obtained from a security camera that need to be tested to determine whether they contain a pedestrian. The testing images 702 may constitute a series of frames from a video camera. At block 704, the gradient magnitude of the testing images 702 is computed. At block 706, the features of the pixels are computed using either option 1 708 or option 2 710. Option 1 708 computes a single feature MS-LBP. Option 2 710 computes integrated features MS-LBP and LBP. At block 712, the features for the blocks are computed using either option 1 714 or option 2 716. At block 720, the pedestrian detection system uses the trained classifier/detector 718 to determine whether the testing image 702 contains a pedestrian. This may be performed by comparing the pattern from produced at block 712 with patterns the trained classifier/detector 718 has determined correspond to images of pedestrians. The results of block 720 may be refined at block 722 through multi-frame accumulation and a tracking-like method to improve the detection of pedestrians. At block 724, the final result of whether the testing images 702 contain a pedestrian is output.

Figure 8:
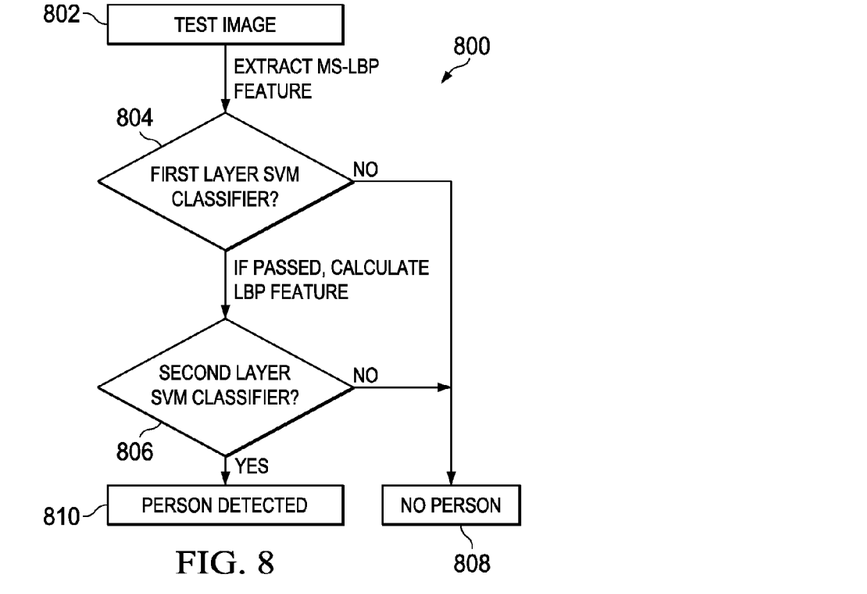
FIG. 8 illustrates an embodiment method for detecting a pedestrian in an image using a 2 layer SVM classifier.

FIG. 8 illustrates an embodiment method 800 for detecting a pedestrian in an image using a 2 layer SVM classifier. The method 800 is an example of a method to implement option 2 in FIGS. 6 and 7. The method 800 eliminates the need to calculate both the MS-LBP and the LBP for every image since some images may be eliminated by MS-LBP alone. The method 800 begins with the receipt of a test image 802 from which MS-LBP features are extracted. At block 804, the method 800 determines whether the test image 802 passes the first SVM classifier and, if not, determines that the test image 808 does not contain a person at block 808, thereby avoiding performing the $2^{nd}$ later SVM classifier. If the test image 802 passes the 1st layer SVM classifier, the LBP feature is calculated and the method 800 determines at block 806 whether the test image 802 passes the $2^{nd}$ layer SVM classifier. If the test image 802 does not pass the $2^{nd}$ layer SVM classifier at block 806, then it is determined that the test image 802 does not contain a pedestrian at block 808. If the test image 802 does pass the $2^{nd}$ layer SVM classifier at block 806, then the method 800 determines that a person is detected 810 in the test image 802. The LBP feature may be a more computationally complex and utilize more resources than the MS-LBP feature determination. Therefore, eliminating some of the test images 802 at the $1^{st}$ layer may improve the performance of the pedestrian detection system.

Figure 9:
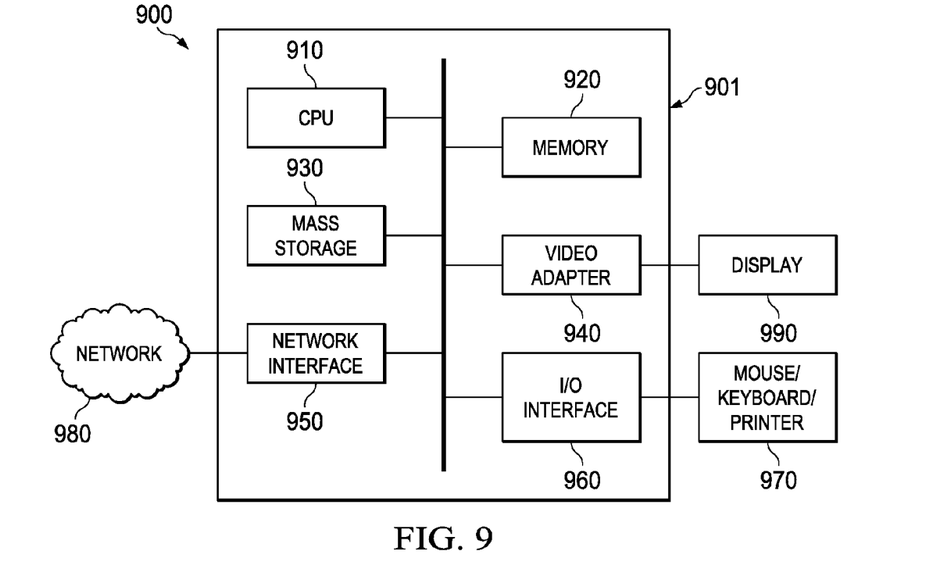
FIG. 9 is a processing system that can be used to implement various embodiments.

FIG. 9 is a block diagram of an example of a processing system 900 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, a memory 920, a mass storage device 930, a video adapter 940, and an I/O interface 960 connected to a bus. The bus may be one or more of any type of several bus architectures including a memory bus or memory controller, a peripheral bus, a video bus, or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The video adapter 940 and the I/O interface 960 provide interfaces to couple external input and output devices to the processing unit. As illustrated, examples of input and output devices include a display 990 coupled to the video adapter 940 and any combination of mouse/keyboard/printer 970 coupled to the I/O interface 960. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for determining whether a person is present in an image, comprising:
    receiving a plurality of images, wherein each image comprises a plurality of pixels;
    determining a modified center symmetric local binary pattern (MS-LBP) feature for the plurality of pixels for each image, wherein the MS-LBP feature is calculated on a gradient magnitude map without using an interpolation process, and wherein a value for each pixel is a gradient magnitude; and
    determining that the person is present in one of the images in accordance with the MSLBP; and
    classifying the image using a linear support vector machine (SVM) that integrates two different features on a single stage classifier, wherein a first of the two different features is created by a first feature descriptor and a second one of the two different features is created by a second feature descriptor, wherein the first feature descriptor is the MS-LBP, and wherein one of the features is the MS-LBP feature created by the MS-LBP.

2. The method of claim 1, wherein one of the two different features comprises a local binary pattern (LBP) feature determined from the plurality of pixels.

3. The method of claim 2, wherein the MS-LBP comprises first vectors and the LBP comprises second vectors and wherein the first and second vectors are concatenated to each other.

4. The method of claim 1, further comprising classifying one of the images using a first layer classifier, wherein no further classifying on the one of the images is performed if the first layer classifier determines that the person is not present in the one of the images.

5. The method of claim 4, further comprising classifying one of the images using a second layer classifier if the one of the images passes the first layer classifier.

6. The method of claim 5, wherein the first layer classifier and the second layer classifier are linked in a non-homogeneous manner.

7. The method of claim 5, wherein the first layer classifier is trained based on the MS-LBP feature.

8. The method of claim 5, wherein the second layer classifier is trained based on a local binary pattern (LBP) feature determined from the plurality of pixels.

9. The method of claim 1, further comprising classifying one of the images as one of containing a pedestrian image and not containing a pedestrian image.

10. The method of claim 9, further comprising training a classifier to classify the images using a plurality of training images.

11. The method of claim 9, further comprising refining a classification using multiple images.

12. The method of claim 11, wherein refining the classification comprises using a tracking-like method.

13. A network component configured for determining a presence of a pedestrian in an image, comprising:
    a processor; and
    a computer readable storage medium storing programming for execution by the processor, the programming including instructions to:
    receive a plurality of images, wherein each image comprises a plurality of pixels;
    determine a modified center symmetric local binary pattern (MS-LBP) feature for the plurality of pixels for each image, wherein the MS-LBP feature is calculated on a gradient magnitude map without using an interpolation process, and wherein a value for each pixel is a gradient magnitude;
    determine that the pedestrian is present in one of the images in accordance with the MS-LBP; and
    classify the image using a linear support vector machine (SVM) that integrates two different features on a single stage classifier, wherein a first of the two different features is created by a first feature descriptor and a second one of the two different features is created by a second feature descriptor, wherein the first feature descriptor is the MS-LBP, and wherein one of the features is the MS-LBP feature created by the MS-LBP.

14. The network component of claim 13, wherein one of the two different features comprises a local binary pattern (LBP) feature determined from the plurality of pixels.

15. The network component of claim 14, wherein the MS-LBP comprises first vectors and the LBP comprises second vectors and wherein the first and second vectors are concatenated to each other.

16. The network component of claim 13, further comprising instructions to classify one of the images using a first layer classifier, wherein no further classifying on the one of the images is performed if the first layer classifier determines that the pedestrian is not present in the one of the images.

17. The network component of claim 16, further comprising instructions to classify one of the images using a second layer classifier if the one of the images passes the first layer classifier.

18. The network component of claim 17, wherein the first layer classifier and the second layer classifier are linked in a non-homogeneous manner.

19. The network component of claim 17, wherein the first layer classifier is trained based on the MS-LBP feature.

20. The network component of claim 17, wherein the second layer classifier is trained based on a local binary pattern (LBP) feature determined from the plurality of pixels.

21. The network component of claim 13, further comprising instructions to classify one of the images as one of containing a pedestrian image and not containing a pedestrian image.

22. The network component of claim 21, further comprising instructions to train a classifier to classify the images using a plurality of training images.

23. The network component of claim 21, further comprising instructions to refine a classification using multiple images.

24. The network component of claim 23, wherein refining the classification comprises using a tracking-like method.

25. A system for determining whether an image contains an image of a pedestrian, comprising:
- a feature computation unit comprising a processor, wherein the feature computation unit is configured to determine a modified center symmetric local binary pattern (MS-LBP) feature for a plurality of pixels for an image, wherein the MS-LBP feature is calculated on a gradient magnitude map without using an interpolation process, and wherein a value for each pixel is a gradient magnitude; and
- a classifier/detector configured to determine whether the image contains an image of a person based at least in part on the MS-LBP,
- wherein the classifier/detector is further configured to classify the image using a linear support vector machine (SVM) that integrates two different features on a single stage classifier, wherein a first of the two different features is created by a first feature descriptor and a second one of the two different features is created by a second feature descriptor, wherein the first feature descriptor is the MS-LBP, and wherein one of the features is the MS-LBP feature created by the MS-LBP.

26. The system of claim 25, wherein the two different features comprise the MS-LBP feature and a local binary pattern (LBP) feature determined from the plurality of pixels.

27. The system of claim 25, wherein the classifier/detector is further configured to classify the image using a first layer classifier.

28. The system of claim 27, wherein the classifier/detector is further configured to classify the image using a second layer classifier if the image passes the first layer classifier.

29. The system of claim 28, wherein the first layer classifier and the second layer classifier are linked in a non-homogeneous manner.

30. The system of claim 25, further comprising a pedestrian detection refinement unit configured to refine a classification of the image using multiple images.

31. The system of claim 30, wherein refining the classification comprises using a training-like method.

* * * * *